United States Patent [19]

Hewitt

[11] Patent Number: 4,694,556
[45] Date of Patent: Sep. 22, 1987

[54] TRACK TREAD

[75] Inventor: Paul Hewitt, Hexham, England

[73] Assignee: George Blair P.L.C., Forth, Great Britain

[21] Appl. No.: 811,311

[22] Filed: Dec. 17, 1985

Related U.S. Application Data

[63] Continuation of Ser. No. 461,206, Nov. 1, 1982, abandoned.

[30] Foreign Application Priority Data

Oct. 31, 1981 [GB] United Kingdom ............. 8132904

[51] Int. Cl.$^4$ ............................................. B23P 11/02
[52] U.S. Cl. ..................................... 29/451; 29/148.3; 29/453; 305/35 R; 305/51; 305/53
[58] Field of Search ............... 24/297; 29/148.3, 450, 29/451, 453; 305/35 R, 39, 51, 54; 403/248, 251, 277

[56] References Cited

U.S. PATENT DOCUMENTS

| | | | |
|---|---|---|---|
| 1,112,258 | 9/1914 | Burton | 403/277 |
| 1,426,316 | 8/1922 | Plumb | 403/251 |
| 1,635,596 | 7/1927 | White | 305/54 |
| 2,177,232 | 10/1939 | Tinnermann | 29/450 |
| 2,270,266 | 1/1942 | Cavanagh | 29/451 |
| 2,332,976 | 10/1943 | Saurer et al. | 305/10 |
| 2,657,894 | 11/1953 | Sklenar | 29/451 |
| 4,534,240 | 8/1985 | Dietz et al. | 403/248 |

FOREIGN PATENT DOCUMENTS

| | | |
|---|---|---|
| 1152631 | 8/1963 | Fed. Rep. of Germany . |
| 1960856 | 6/1971 | Fed. Rep. of Germany . |
| 3025840 | 2/1982 | Fed. Rep. of Germany . |
| 849618 | 11/1939 | France . |
| 1303537 | 8/1962 | France . |
| 2391895 | 12/1978 | France . |
| 975273 | 11/1964 | United Kingdom ............. 305/35 R |

Primary Examiner—Stephen C. Bentley
Attorney, Agent, or Firm—Cushman, Darby & Cushman

[57] ABSTRACT

The invention disclosed is that prefabricated wear pads are applied to the track link bodies of tracked vehicles by inserting projections of the pads through apertures in the link body from one side of the apertures and locking means co-acts with the projections to lock same to the body. Suitably, the locking means are push engagement with said projections to lock the pads to the link bodies as opposed to the conventional method of moulding the pad around and through the links. In an alternative arrangement, the locking means are cast in locking engagement with the projections as opposed to the push fitting.

3 Claims, 11 Drawing Figures

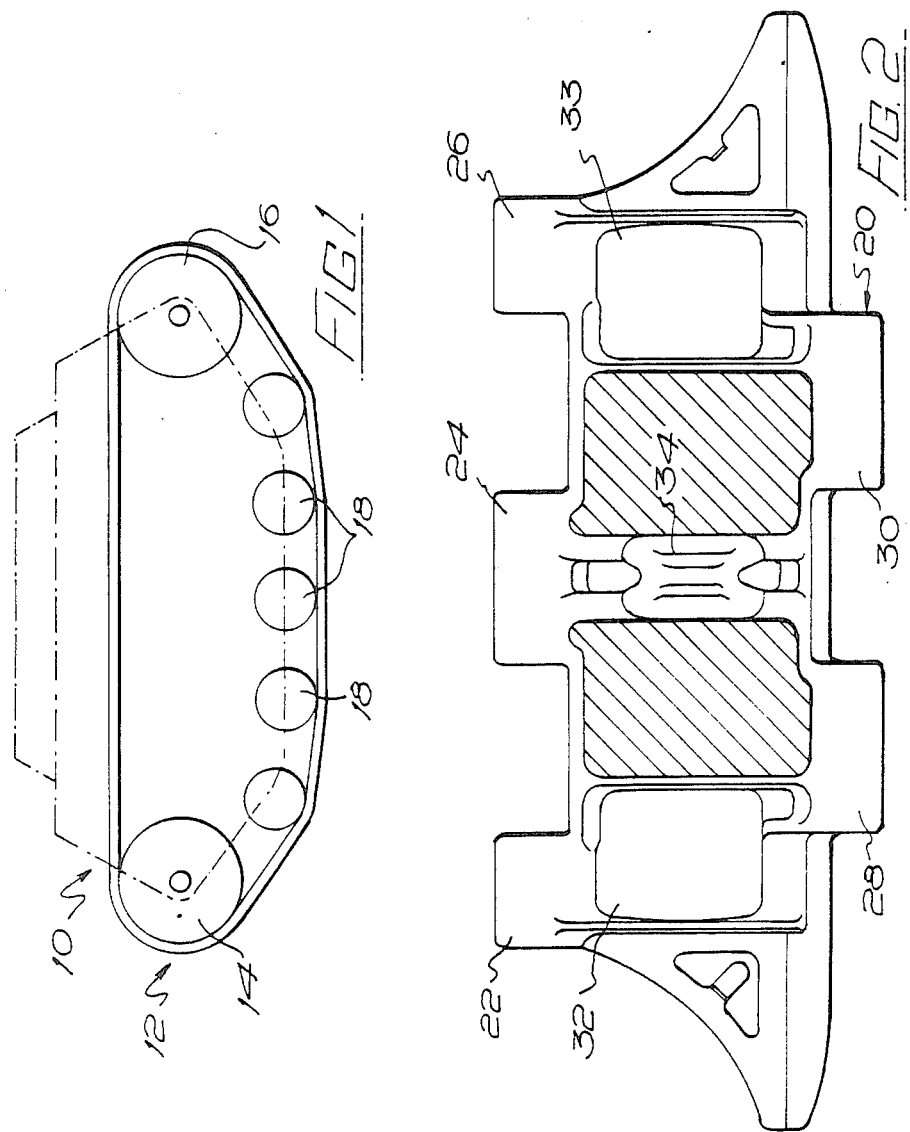

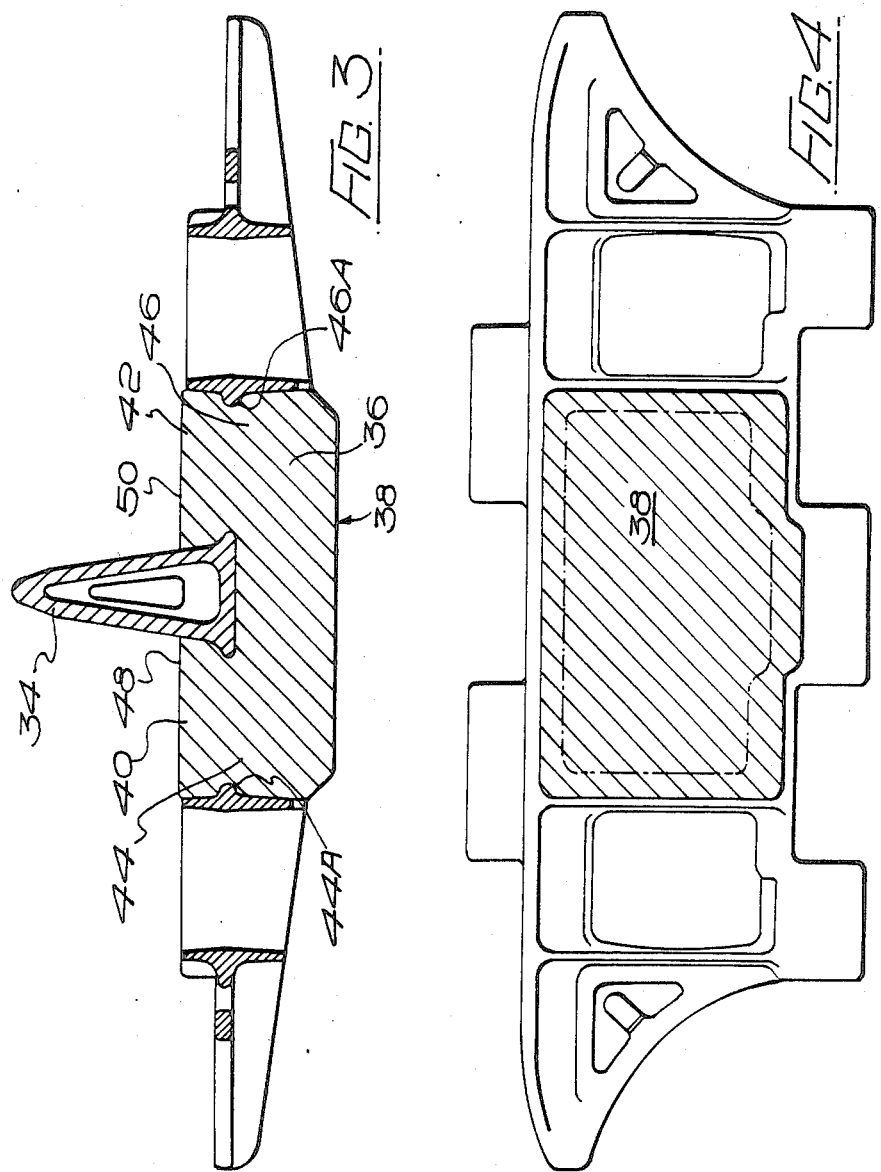

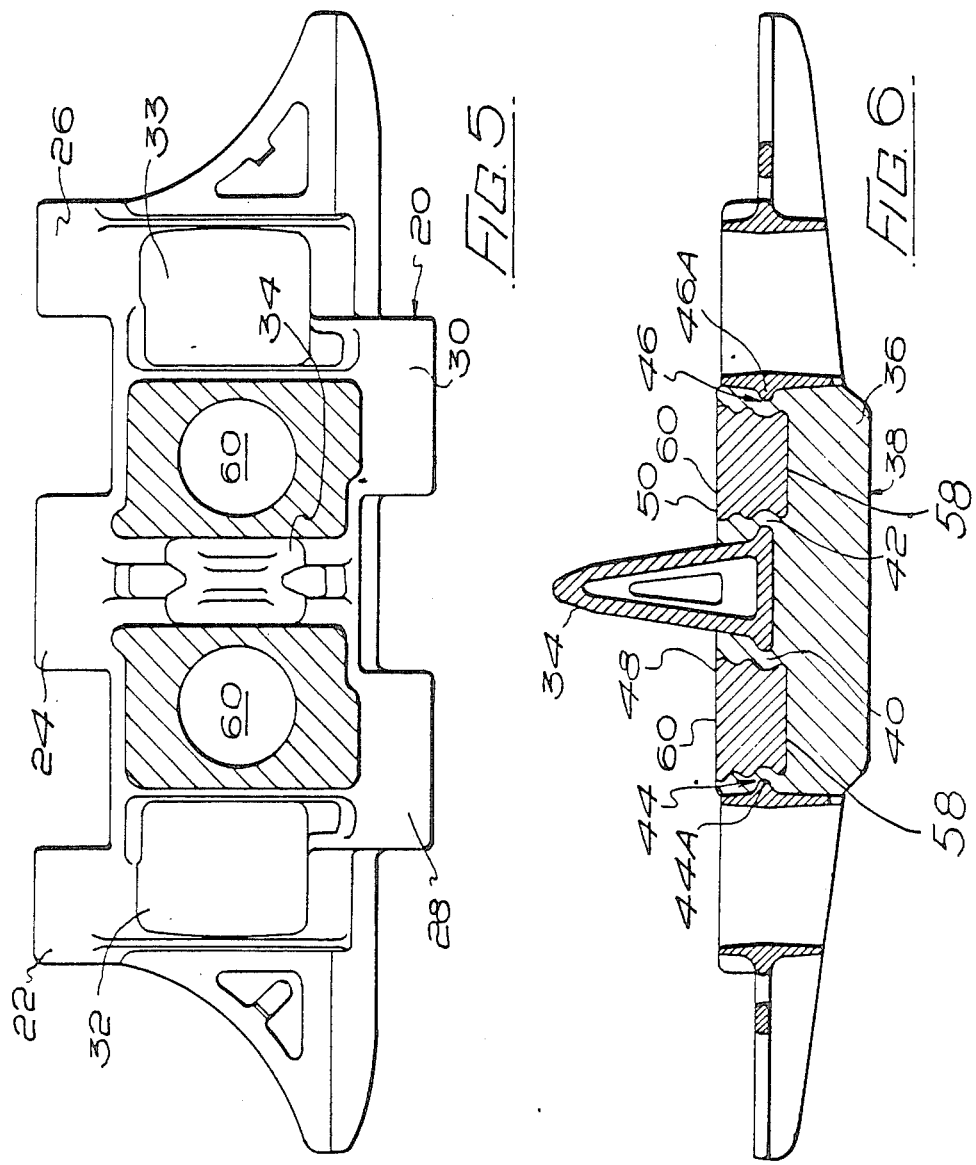

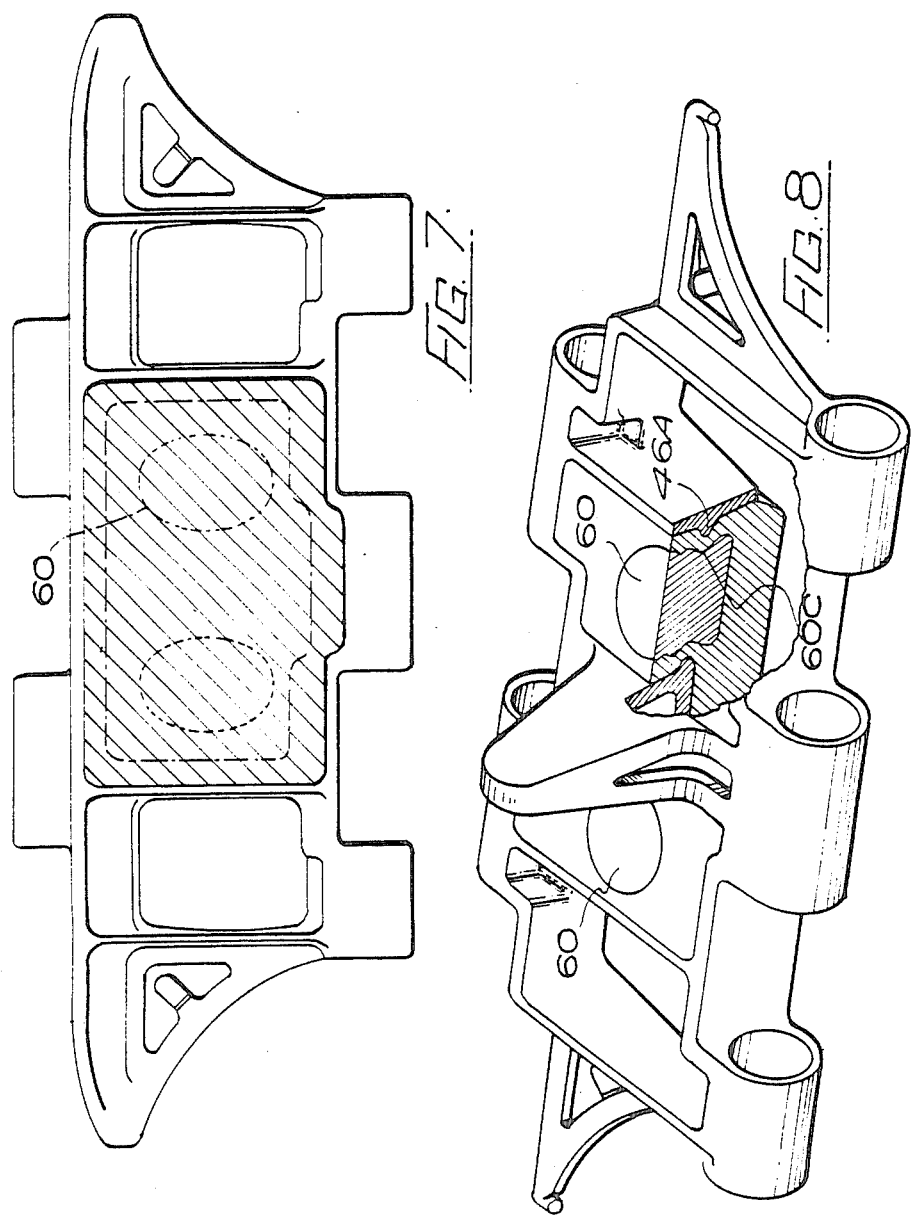

TRACK TREAD

This is a continuation of application Ser. No. 461,206, filed Nov. 1, 1982, which was abandoned upon the filing hereof.

This invention relates to tracked vehicles and in particular concerns the links of the tracks of the vehicles. The type of vehicle to which the present invention is related comprises one or more tracks made up of a plurality of links which are normally pivotally interconnected. Each of the links is provided with a ground engaging wear pad of rubber or the like material, the pad being secured to a rigid link body, which suitably may be a metal casting.

The known method of connecting the wear pad to the link body is to pressure mould the pad to the link body. The composition which forms the pad is forced under heat and pressure into a mould in which the link body is appropriately positioned, so that the composition forms around the body and thereby becomes anchored thereto.

In a specific arrangement, the body is a generally elongated member with a pair of spaced apertures, and the composition moulds through the said apertures so as to define at one side of the link a ground engaging wear surface, and to define at the other side of the link two wear surfaces which engage and travel round road wheels of the vehicle, as will be explained in relation to the embodiment described herein.

The body defining the said apertures is shaped so that the apertures have a neck region which is the narrowest cross section of the apertures, and the composition moulds around and to opposite sides of the said aperture neck regions, whereby the moulding becomes firmly anchored to the body.

Track links for these vehicles have been fabricated in this fashion for many years, but it is believed that the links and their method of manufacture can be improved. The difficulty with the current method of manufacture is that the body, which is normally a moulding, must be placed in a further mould in order to effect moulding of the wear surface, but more significantly, when the wear surface has eroded as a result of use, because of the method of manufacture and the economics thereof, in fact the entire track of the vehicle is scrapped and is replaced by a new track, which includes new link bodies and new wear surfaces.

The present invention is concerned with providing the links with wear surfaces in a fashion which obviates or mitigates the need to scrap tracks or even links when the wear surfaces have been exhausted as a result of use.

It should be mentioned that wear surfaces of track vehicles of the type to which the invention relates have a relatively short life i.e. of the order of 1,250 to 2,500 miles depending on maintenance and type of use.

In accordance with the present invention, a wear surface pad is applied to a link body of a track of a tracked vehicle by fabricating separate from the link body the pad and a locking member, which may be of a material which is the same as or different from the pad, the said member being adapted to be lockingly fitted to the pad by interengaging the locking member from opposite sides of an aperture in the link body, thereby locking the pad to the body.

In another aspect of the invention, the pad is again fabricated, and a portion thereof is caused to extend through an aperture in the body, and then a castable material is cast around and/or in the said portion which extends through the aperture to form a locking means thereby to lock the pad to the body.

In either aspect, when the pad is worn, it can be removed and replaced in similar fashion by another pad.

In an example of the first aspect of the invention, a portion of the pad extends through an aperture, and said portion is in the form of a cup which widens from a base region, and the locking of the pad is achieved by forcing a plug into the cup to expand same. In an alternative arrangement of the first embodiment, the said projection is a plug which has an undercut groove, and a push fitted ring is passed over the projection, the ring having a flange which engages the undercut groove thereby to lock the pad to the body.

In either case, the plug or ring may be of a material such as nylon, whilst the pad may be of a hardened rubber.

In the second aspect of the invention, a plug or ring is cast around the projecting portion of the pad to provide the same effect as above described.

In a typical link, the body has a pair of spaced apertures, and the pad has two projections which respectively extend through the apertures, the main pad surface bridging the apertures.

The link body may be provided with the conventional locating horn in the central position thereof, and drive sprocket apertures.

In each case, the pad can be fitted to the body without utilising any special moulds for moulding the pad to the body, and the invention further provides that the pads can be replaced without having to discard the link bodies, and indeed in some cases it will be possible to fit replacement pads to tracks whilst the vehicle is on site or location. This is extremely important in the case of military vehicles, such as tanks and personal carriers when operational in the field.

The invention also comprises a link of a track of a tracked vehicle, the link comprising a link body having an aperture, a wear material ground engaging pad, said pad having a projection which passes through the apertures, and a locking means co-acting with the projector to lock the pad to the body.

The various aspects of the invention will be clearer upon consideration of a specific embodiment (with modifications) of the invention, now given with reference to the accompanying drawings, wherein:

FIG. 1 is a diagrammatic view showing the side view of a track vehicle having a track with links constructed according to the invention;

FIGS. 2 to 4 show a link of a tracked vehicle constructed in conventional fashion, the figures respectively being an underneath plan, a sectional side view, and a plan;

FIGS. 5 to 7 are views similar to FIGS. 2 to 4, but show a link according to the invention;

FIG. 8 is a perspective view of the link shown in FIGS. 5 to 7, partly cut away to show detail;

Figure 10:
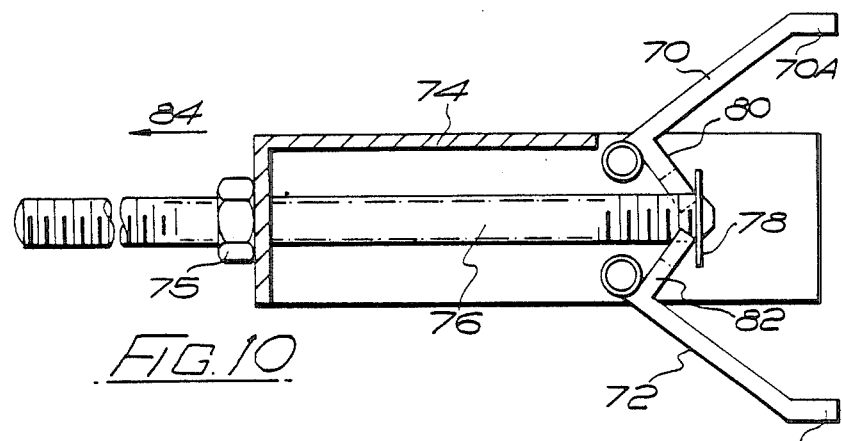
FIGS. 10 and 11 show respectively a sectional side and end elevation of a tool for inserting the pad projections in the link bodies.

In FIG. 1 a vehicle 10 which may be a military or commercial vehicle is shown diagrammatically, and it comprises a pair of endless tracks 12 which are trained round sprockets 14 and 16, which also travel round rubber tire ground wheels 18. the track 12 travels between the ground and the wheels 18 when the vehicle is in use. Each track 12 comprises a plurality of pivotally interconnected links, of which one is shown in detail in FIGS. 2 to 8.

Referring to FIGS. 2 to 4, it will be seen that the link comprises a generally elongated link body 20, which is in fact a casting, and the body is provided along one side with three spaced bosses 22, 24 and 26, and along the other side with spaced bosses 29 and 30 which are staggered relative to bosses 22, 24 and 26 of the adjacent link, and a pivot pin passes through the bosses to complete the pivotal connection. The link 20 has towards the ends thereof sprocket drive apertures 32 and 33, and centraly of the link, and from the side which is the inside of the link in use, extends a location tooth or horn 34. This horn 34 in fact locates between the spaced halves of each of the sprocket wheels 14 and 16 and the road wheels 18, as each of those wheels is in two spaced halves.

The link is provided with a rubber ground engaging wear pad 36, which has a main ground engaging region 38 to the outside of the link body, and two projections 40 and 42 which pass through locking apertures to opposite sides of the projection 34.

If reference is made to FIG. 3, it will be seen that each of the locking apertures is defined by a narrow neck 44 and 46 defined by internal ribs 44A and 46A of the body, which forms a lock for the material of the pad to keep same in position. The ribs 44A and 46A extend around the whole of the inner surface defining apertures 32, 33. In order to produce the pad 36, the body is positioned in a suitable mould, and then the rubber composition which forms the pad 36 is injected into a cavity so as to form the shape illustrated in FIGS. 2 to 4 in the drawings. The medium is hot when injected, and bonds to the body 20.

The inner surfaces 48 and 50 of the projections 40 and 42 form tread surfaces for the ground wheels 18.

The problem with the arrangement illustrated in FIGS. 2 to 4 is that when the surface 38, and also the surfaces 48 and 50 wear to such an extent that the metal of the body 20 is frictionally engaged by the ground, it is usual for the entire link, and indeed the entire track to be replaced. The present invention seeks to provide an arrangement whereby the pads 36 can be replaced without having to discard the link body 20, and indeed so that replacement pads can be fitted on location.

Figure 9:
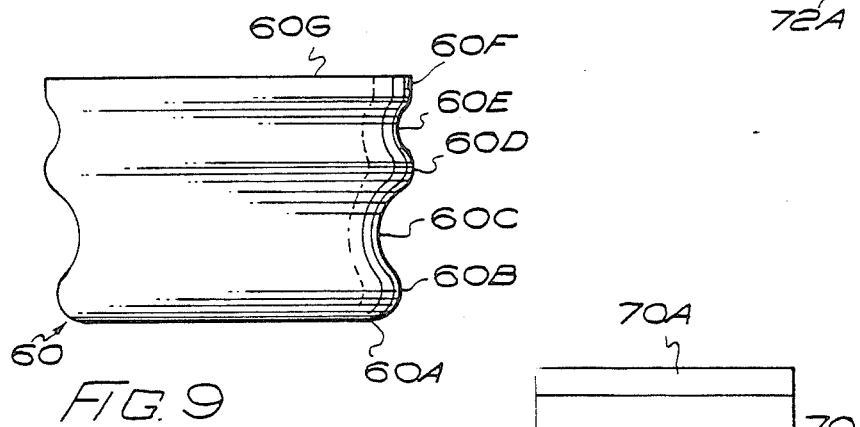
FIG. 9 is a side elevation of one of the locking plugs shown in FIGS. 5 to 8.

One arrangement according to the invention is shown in FIGS. 2 to 9 FIGS. 5 to 7 being similar to FIGS. 2 to 4 but illustrating the embodiment of the invention, whilst FIG. 9 illustrates the link of FIGS. 5 to 7 in perspective view and FIG. 9 shows one of the locking plugs. Where appropriate the same reference numerals used in FIGS. 2 to 4, have been used in FIGS. 5 to 9.

In the arrangement shown in FIGS. 5 to 7, the pad 36 is provided in each projection 40, 42 with a cup shaped recess 58 of which the inner contour is of the form shown in FIG. 6 and the outer contour follows the necking of the aperture 44A, 46A. FIG. 6 also shows that a plug 60 of corresponding shape is forced for example by hammering each aperture 58, thereby to lock the pad projection 40, 42 to the link body 52. Each plug 60 would be of a relatively hard material in order to acheive a firm wedging effect. Each plug 60 is flush, as indicated in FIG. 6, with the top edge 48, 50 of the associated projection 40, 42. The cut away view of FIG. 8 shows the arrangement clearly.

FIG. 9 shows one of the plugs 607 in side elevation, and illustrates the profile of same, such profile being particularly suitable, as shown by tests, for locking the projections 40, 42 to the link body. The plug 60, which is circular in cross section, has a flat base 60A which leads to a first convex portion 60B, followed by a first concave portion 60C, followed by a second convex portion 60D, followed by a sescond concave portion 60E followed by a short cylindrical portion 60 leading to a flat top 60G. The maximum diameter of convex portion 60B being less than the maximum diameter of the convex portion 60D, the ratio of said maximum diameters being in the region of 1:1.01. Similarly, the minimum diameter of the convex portion 60C is less than the minimum diameter of concave portion 60E, the ratios of such diameters being in the order of 1:1.16. The radius of curvature of sections 60B, 60D and 60E being the same, and approximately half of that of section 60C. FIG. 9 is to scale. FIGS. 6 and 8 show how the deep concave section 60C registers with the neck forming rib 46A to lock the pad projections firmly in place.

To connect the pad to the link body the projections are passed through the apertures and then the plugs 60 are hammered into the projections 40, 42, locking same to the body.

Figure 11:
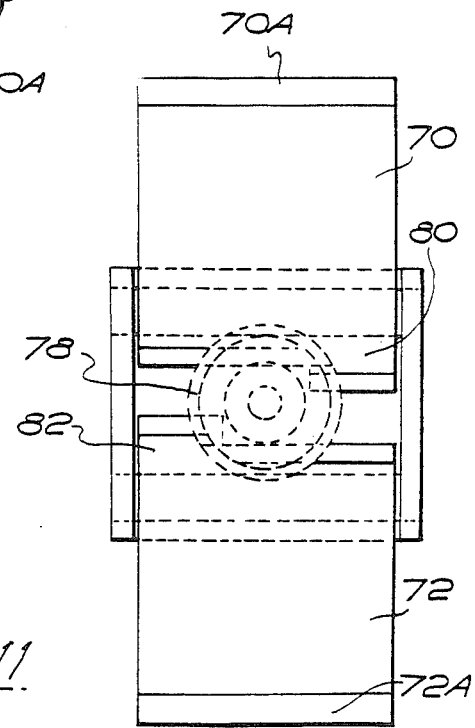

In the embodiment, pad 36 is a relatively soft material i.e. rubber, whilst the plugs 60 are of relatively hard material i.e. nylon, but it is preferable to insert the projections in the apertures by means of an insertion tool, and FIGS. 10 and 11 illustrate one form of tool which can be used. The tool comprises a pair of gripping plates 70, 72 pivotally mounted in an elongated frame 74 which supports a plunger rod 76 which can be displaced axially by turning a drive 75, the rod being suitably threaded for this purpose. One end of the rod 76 has a washer 78 which engages pivot arms 80, 82 integral with the plates 70, 72 when the plunger is displaced in the direction of arrow 84, pivoting the plates 70, 72 into a closed position gripping and distorting the projection 40, 42 of the pad in the groove 60C in the outer surface of same by the bent end portions 70A, 72A of said plates, whereby the projection can be pulled through the link body aperture, after which the tool is released by moving the rod 76 in the direction opposite to direction 84. Of course, it will be appreciated that the tool is fed through the aperture before the gripping of the projection takes place, and whilst said feeding through takes place, the plates 70, 72 are in closed condition. A single tool can be used to pull through the projections 40, 42 one after the other, or a multiple tool can pull both projections through the apertures at the same time.

In an alternative arrangement, instead of the projection having a recess, it is provided with an undercut groove, and a ring is push fitted over the projection so that a ledge thereof engages in the undercut groove in order to lock the projection to the body.

In each case the pad with the projections is fabricated and positionable in relation to the link body without utilising a mould as in the conventional arrangement, and connection would be established by friction fitting the plug on the one hand, or the cap or ring on the other hand, from opposite sides of the apertures.

It may be possible to have the parts of the connection of the same rubber material which is used for the pad, but is is believed that it will be better to have the plug or ring of a harder material, such as nylon.

In an alternative arrangement, instead of using a prefabriciated plug or cap or ring arrangement, when the projection is suitably in position in relation to the body, the plug, corresponding to plug or the ring could be cast using castable material which solidifies to a hard wear resistant material, the projection or projection and link body forming a mould cavity for the cast material.

Indeed, other forms of locking members may be used instead of force fitted rings or plugs.

With any of the arrangements of the present invention, when there is wear on the wear pad to such an extent requiring replacement, it is simply a matter of drilling out the residual portion of the wear material, and replacing same in the manner described.

Modifications may be made to the invention without departing from the scope thereof.

I claim:

1. A method of applying a wear surface pad to a link body of an endless track of a tracked vehicle, said link body having at least one aperture where the aperture wall is provided with a circumferential locking rib defining a neck in the aperture which is smaller in diameter than the remainder of the aperture and is intermediate the ends thereof, the wear surface pad being of resilient plastic and which has at least one projection integral with the pad and of the same resilient plastic, said projection having a circumferential groove to receive said circumferential locking rib, the projection comprising a wall defining a hollow interior to allow deforming of the projection, said method comprising resiliently deforming the projection and passing it so deformed into the aperture to engage said locking rib with said circumferential groove, releasing the deforming force on the projection, inserting a plug into the hollow interior of the projection to force the projection wall against the aperture wall and lock the pad to the link body, the plug being of a size and shape corresponding to the hollow interior of the projection.

2. A method according to claim 1 wherein said pad is provided with two spaced projections which are inserted into two corresponding apertures in the link body and inserting a plug into each recess of the projections.

3. A method according to claim 1 wherein the plug is of a harder material than the pad.

* * * * *